(12) United States Patent
Reddy et al.

(10) Patent No.: US 11,792,011 B1
(45) Date of Patent: Oct. 17, 2023

(54) TACTILE BINARY CODED COMMUNICATION

(71) Applicant: Wells Fargo Bank, N.A., San Francisco, CA (US)

(72) Inventors: Suresh Reddy, Hyderabad (IN); Ramya Balasubramanian, Secunderabad (IN); Satin Bhandari, Secunderabad (IN); Vaikumar Somanapalli, Hyderabad (IN); Chandana Komuravelli, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 236 days.

(21) Appl. No.: 17/214,353

(22) Filed: Mar. 26, 2021

Related U.S. Application Data (63) Continuation of application No. 16/003,813, filed on Jun. 8, 2018, now Pat. No. 10,965,464.

(51) Int. Cl.
| | |
|---|---|
| *H04L 9/32* | (2006.01) |
| *G06F 3/01* | (2006.01) |
| *G06F 21/32* | (2013.01) |
| *G06F 3/0488* | (2022.01) |
| *G10L 21/013* | (2013.01) |
| *H04L 15/00* | (2006.01) |

(52) U.S. Cl.
CPC .......... *H04L 9/3231* (2013.01); *G06F 3/016* (2013.01); *G06F 3/0488* (2013.01); *G06F 21/32* (2013.01); *G10L 2021/0135* (2013.01); *H04L 15/00* (2013.01)

(58) Field of Classification Search
CPC ....... H04L 9/3231; H04L 15/00; G06F 3/016; G06F 3/0488; G06F 21/32; G10L 2021/0135
See application file for complete search history.

(56) References Cited

U.S. PATENT DOCUMENTS

| | | | |
|---|---|---|---|
| 7,203,721 B1 | 4/2007 | Ben-Efraim et al. | |
| 7,230,721 B2 | 4/2007 | Ben-Efraim et al. | |
| 9,602,983 B1 | 3/2017 | Rahman | |
| 2002/0165013 A1* | 11/2002 | Bright .................. | G06F 3/0233 455/567 |

(Continued)

FOREIGN PATENT DOCUMENTS

| | | |
|---|---|---|
| CN | 104301109 A | 1/2015 |
| KR | 10-1587354 B1 | 1/2016 |
| KR | 101587345 B1 | 1/2016 |

*Primary Examiner* — Huan V Doan
(74) *Attorney, Agent, or Firm* — K&L Gates LLP (57) ABSTRACT

Surreptitious communication with a user is disclosed by way of binary tactile inputs and outputs. A communication module of a computing device receives a first alphanumeric message that is converted to a first binary coded message that is rendered as first and second vibration outputs that are humanly distinguishable. A touch input component of one of a touch screen and a motion sensor detects a sequential pattern of user touches. Distinguished first and second tactile inputs in the sequential pattern identify a second binary coded message that is converted into a second alphanumeric message. First and second alphanumeric messages are comprised of a combination of characters selected from one or more of: (i) letters; (ii) numerals; and (iii) symbols.

17 Claims, 7 Drawing Sheets

(56) References Cited

U.S. PATENT DOCUMENTS

| | | | |
|---|---|---|---|
| 2003/0217120 A1 | 11/2003 | Hlckey et al. | |
| 2005/0004801 A1* | 1/2005 | Liebermann | G10L 15/26 |
| | | | 704/271 |
| 2006/0165060 A1* | 7/2006 | Dua | G06Q 20/401 |
| | | | 705/76 |
| 2007/0152035 A1* | 7/2007 | Adams | G06Q 20/352 |
| | | | 235/492 |
| 2011/0053577 A1* | 3/2011 | Lee | H04M 1/72436 |
| | | | 455/418 |
| 2012/0007809 A1* | 1/2012 | Mahalingam | G06F 3/04886 |
| | | | 345/173 |
| 2013/0262123 A1 | 10/2013 | Boukadakis | |
| 2014/0049476 A1* | 2/2014 | Bragin | G06F 1/169 |
| | | | 345/173 |
| 2015/0106887 A1 | 4/2015 | Aslund | |
| 2015/0148106 A1* | 5/2015 | Choi | H04M 1/0266 |
| | | | 455/566 |
| 2017/0214687 A1 | 7/2017 | Klein et al. | |
| 2020/0118463 A1 | 4/2020 | Khermayer | |

* cited by examiner

TACTILE BINARY CODED COMMUNICATION

CROSS-REFERENCE TO RELATED APPLICATIONS

This application is a continuation of U.S. application Ser. No. 16/003,813, filed Jun. 8, 2018, and entitled "TACTILE BINARY CODED COMMUNICATION," the entirety of which is incorporated herein by reference.

BACKGROUND

Users have access to a wide range of services and resources via user devices such as laptops, desktop workstations, smartphones, smart watches, etc. With this increased reliance and ubiquitous nature of user devices, vulnerabilities have also increased. Many techniques are used to intercept user online identities to commit malicious activities such as fraud and espionage. To safeguard important online resources, businesses have added additional features for fraud detection and user authentication. Users are often asked to input identifying information for authentication.

However, such safeguards are compromised by the increasing mobility and number of mobile devices. Mobile devices are frequently in proximity to third parties and devices that capture audio and images. Sensitive information needs additional safeguards to preclude being intercepted by third parties. Safeguarding sensitive information is made more challenging when interacting with users who have visual limitations. Increasing the font size of a display or verbalizing the information makes interception easier.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

The present disclosure contemplates that a binary coded tactile communication can be facilitated through a mobile device in one or both of: (i) communication to a user; and (ii) communication from the user. Unlike customized gestures, binary code lends itself to standardize teaching. The simplified interaction with the mobile device, such as receiving a vibrated binary code message or sending a tap-based binary code message, enables users to communicate securely and conveniently. A tactile binary code, such as Morse code, is readily translatable with alphanumeric text. Unlike spoken communication and interacting with a graphical interface, inputting or outputting a tactile communication can be done in a surreptitious manner, avoiding interception by bad actors. Conversion of the tactile binary code into an alphanumeric message can also be done within an encrypted component of the mobile device, avoiding key logging malware that monitors text inputs via hard or soft keys.

In one aspect of subject disclosure, a system is provided that comprises a processor coupled to a memory that includes instructions that, when executed by the processor, cause the processor to monitor a computing device for a sequential pattern of user touches, distinguish tactile inputs from the sequential pattern of user touches based on at least one of a number of touches, an interval of time between user touches, or a magnitude of impact of each user touch to identify an encoded message in the sequential pattern of user touches, and convert the encoded message into an alphanumeric message. The instructions can further cause the processor to encrypt the alphanumeric message or initiate transmission of the alphanumeric message to a second computing device. The instructions can also cause the processor to monitor a touch screen or motion of the computing device for the sequential pattern of user touches. In one instance, the encoded message can be a binary coded message such as one specified in Morse code. The instructions can further cause the processor to convert a received alphanumeric message to a second encoded message, and trigger vibration of the computing device corresponding to the second encoded message, wherein elements of the second encoded message are humanly distinguishable vibrations. In one situation, the received alphanumeric message is a request of a passcode associated with authentication.

In one aspect of the subject disclosure, a method is provided that comprises monitoring a computing device for a sequential pattern of tactile input, distinguishing elements of the tactile input based on one or more of a number of touches, an interval of time between touches, or a magnitude of each touch to identify an encoded message in the sequential pattern of tactile input, and generating an alphanumeric message based on the encoded message. Further, the method can comprise initiating transmission of the alphanumeric message to a second computing device over a network. In one instance, monitoring can comprise monitoring a touch screen of the computing device for the sequential pattern of tactile input. Additionally, Morse code can be distinguished from the tactile input. The method can further comprise receiving a second message and triggering vibration of the computing device in a manner that corresponds with the second message. Furthermore, the method can comprise receiving a second alphanumeric message, converting the second alphanumeric message to a second encoded message, and triggering the vibration of the computing device in a manner that corresponds with the second encoded message. Further yet, the method can comprise receiving a request for a passcode as the second message and initiating transmission of the alphanumeric message in response to the request.

In one aspect of the subject disclosure, another method is provided that comprises executing, on a processor, instructions that cause the processor to perform operations. The operations can include converting a received alphanumeric message corresponding to a request for a passcode in conjunction with user authentication to a binary coded message, and triggering a sequence of vibrations a user computing device that corresponds to the binary coded message, wherein elements of the sequence of vibrations are humanly distinguishable based on one or more of a number of vibrations, an interval of time between vibrations, or a magnitude of each vibration. Operations can further comprise monitoring the user computing device for a sequential pattern of tactile input, distinguishing elements of the tactile input based on one or more of a number of touches, an interval of time between touches, or a magnitude of each touch to identify an encoded message in the sequential pattern of tactile input, generating a second alphanumeric message based on the encoded message, and initiating transmission of the second alphanumeric message in response to the request for the passcode.

The following description and annexed drawings set forth certain illustrative aspects and implementations. These are indicative of but a few of the various ways in which one or more aspects may be employed. Other aspects, advantages, or novel features of the disclosure will become apparent from the following detailed description when considered in conjunction with the annexed drawings.

BRIEF DESCRIPTION OF THE DRAWINGS

Aspects of the disclosure are understood from the following detailed description when read with the accompanying drawings. Elements, structures, etc. of the drawings may not necessarily be drawn to scale. Accordingly, the dimensions of the same may be arbitrarily increased or reduced for clarity of discussion, for example.

DETAILED DESCRIPTION

In one or more embodiments, the present disclosure provides a mobile device, computer program recording medium and method of surreptitious communication with a user by way of a mobile device using binary tactile inputs and/or outputs. A communication module of the mobile device receives a first alphanumeric message. The mobile device converts the first alphanumeric message to a first binary coded message that is rendered as first and second vibration outputs that are humanly distinguishable. A touch input component of one of a touch screen and a motion sensor detects a sequential pattern of user touches as a response. Mobile device distinguishes first and second tactile inputs in the sequential pattern to identify a second binary coded message. Mobile device converts the second binary coded message into a second alphanumeric message. First and second alphanumeric messages are comprised of a combination of characters selected from one or more of: (i) letters; (ii) numerals; and (iii) symbols. In one or more embodiments, the first and second binary coded messages are based on Morse code.

Embodiments or examples illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

The following terms are used throughout the disclosure, the definitions of which are provided herein to assist in understanding one or more aspects of the disclosure.

As used herein, the term "infer" or "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

Figure 1:
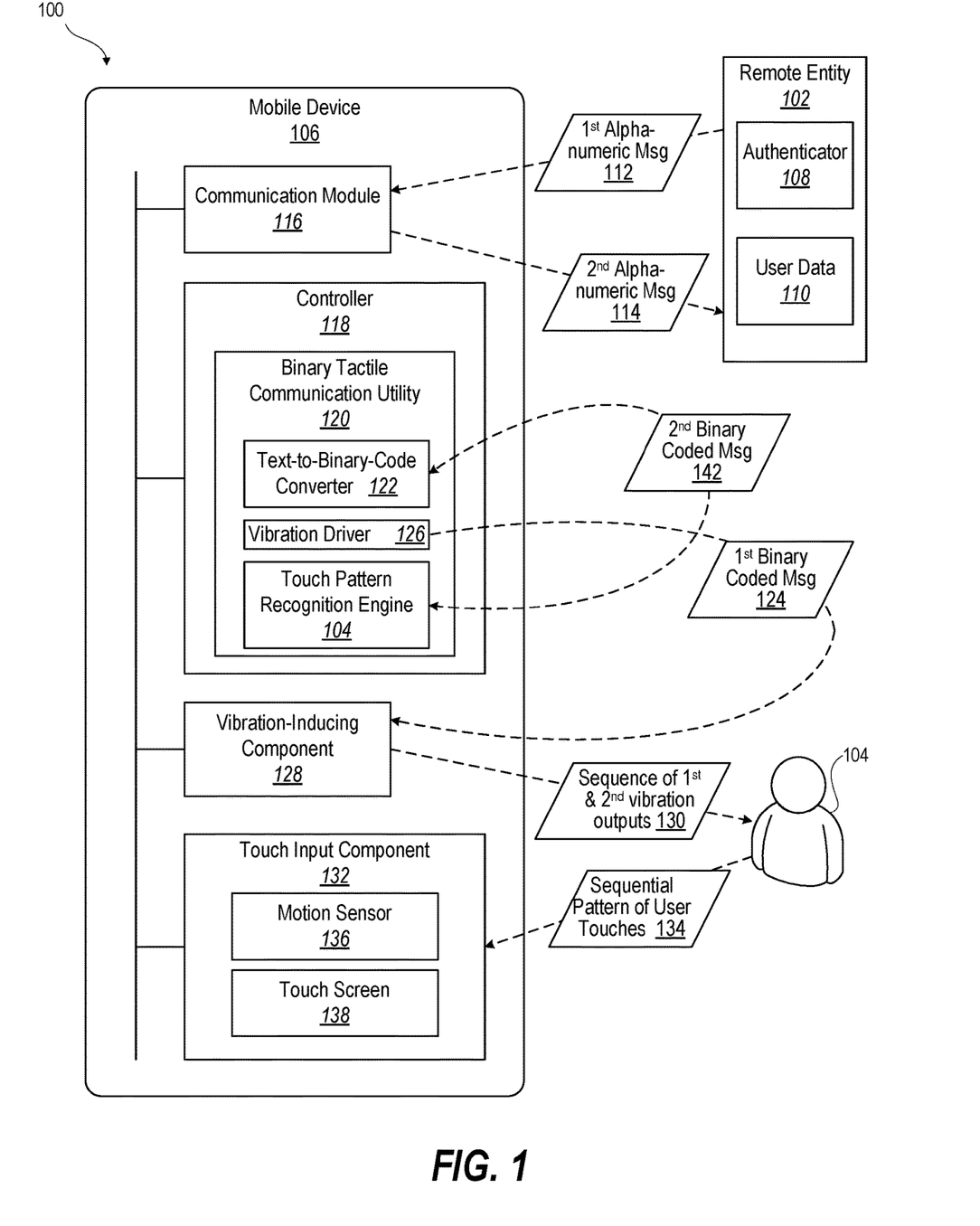
FIG. 1 illustrates a block diagram of a system for surreptitious tactile binary communication via a mobile device, according to one or more embodiments.

Turning to the figures, FIG. 1 illustrates a system 100 that enables surreptitious communication between a remote entity 102 and a user 104 via a mobile device 106. Remote entity 102 has an authenticator 108 that utilizes user data 110 to generate and transmit first alphanumeric message 112 to mobile device 106. Remote entity 106 awaits second alphanumeric message 114 from mobile device 106 that is responsive to first alphanumeric message 112.

Mobile device 106 includes communication module 116 that receives and transmits respectively first and second alphanumeric messages 112, 114 that are comprised of a combination of characters selected from one or more of: (i) letters; (ii) numerals; and (iii) symbols. Controller 118 of mobile device 106 has a binary tactile communication utility 120 that processes first alphanumeric message 112 and generates second alphanumeric message 114. In particular, a text-to-binary converter 122 of binary tactile communication utility 120 converts first alphanumeric message 112 to first binary coded message 124. Vibration driver 126 of binary tactile communication utility 120 modulates a vibration drive signal with first binary coded message 124. vibration-inducing component 128 such as a vibrator motor with first binary coded message 124. Vibration-inducing component 128 renders the first binary coded message as a sequence of first and second vibration outputs 130 corresponding to the first binary coded message 124. First vibration output is humanly distinguishable from the second vibration output, such as by duration.

User 104 manually taps, shakes, or squeezes touch input component 132 of mobile device 106 with sequential pattern of user touches 134. In particular, touch input component 132 can be a selected one of: (i) a motion sensor 136; and (ii) touchscreen 138 for receiving sequential pattern of user touches 134 in response to the rendered sequence of first and second vibration outputs 130. Touchscreen can be repurposed manual controls of mobile device 106. Touch pattern recognition engine 140 of binary tactile communication utility 120 distinguishes any first and second tactile inputs from the sequential pattern of user touches 134 to identify a second binary coded message 142 contained in the sequential pattern of user touches 134. In one or more embodiments, controller 118 distinguishes first and second tactile inputs from the sequential pattern of user touches 134 based on a selected one of: (i) a number of taps; (ii) an interval of time between user touches; and (iii) a magnitude of impact of each user touch to identify second binary coded message 114 contained in sequential pattern of user touches 134. Text-to-binary code converter 122 converts second binary coded message 142 to second alphanumeric message 114 comprised of a combination of characters selected from one or more of: (i) letters; (ii) numerals; and (iii) symbols for transmitting by communication module 116.

Figure 2:
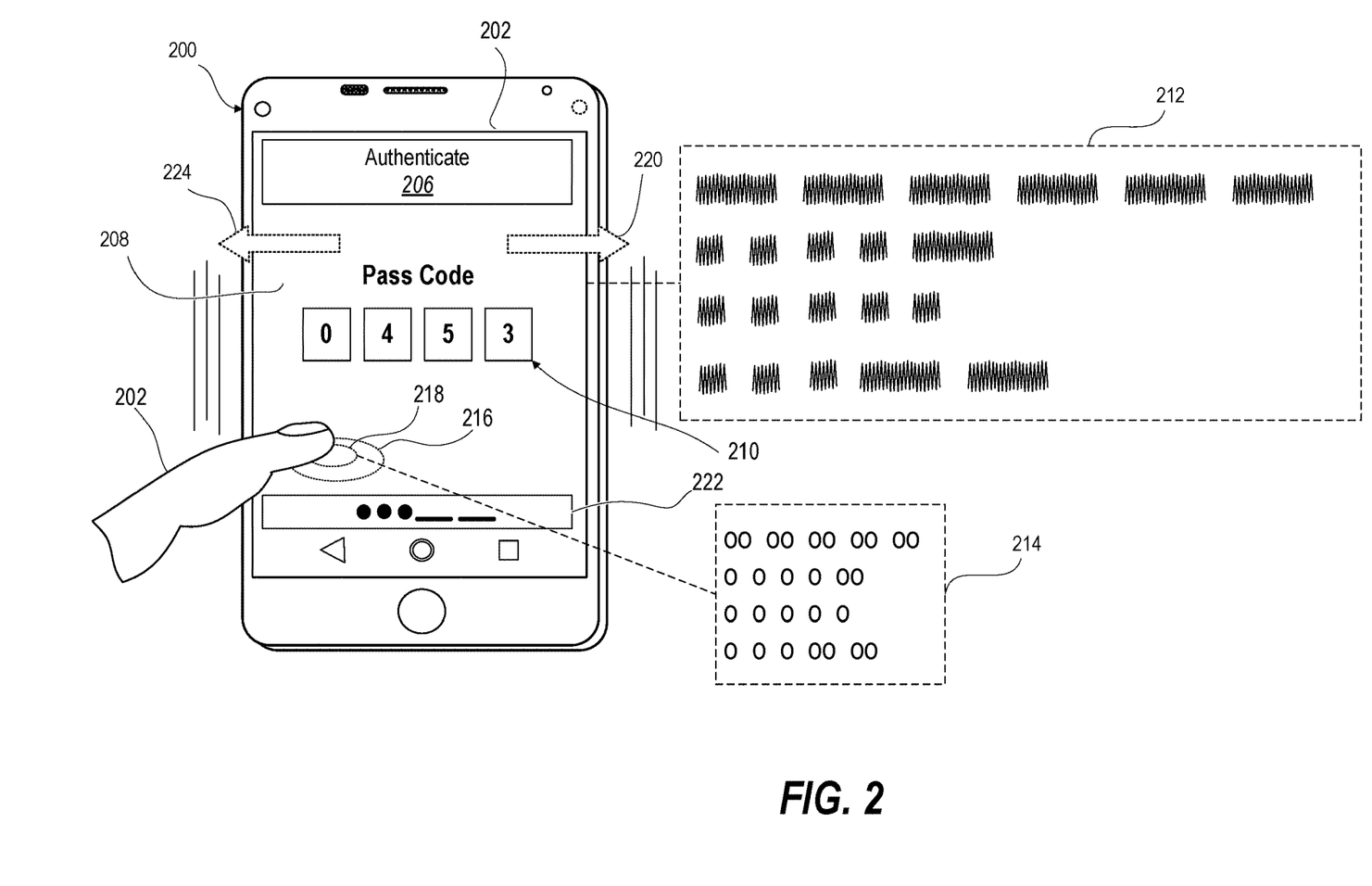
FIG. 2 illustrates a front view of a mobile device that is performing two-way surreptitious tactile binary communication, according to one or more embodiments.

FIG. 2 illustrates a front view of mobile device 200 that is performing two-way surreptitious tactile binary communication for user 202, according to one or more embodiments. Mobile device 200 includes a graphical touchscreen 204 that presents authentication view 206 on user interface 208. In selected modes, visually-presented authentication or pass code 210 is rendered on graphical touchscreen 204. Mobile device 200 can require primary or secondary vibrational output type of communication. For example, mobile device 200 can be one of: (i) within a pocket of a user garment; (ii) configured for a visually-challenged user; and (iii) in a mode of operation to avoid cameras or third parties from intercepting the authentication code 210. Pass code 210 "0453" is output as a binary coded vibrational output 212 using Morse code as "-----●●●●-●●●●●●●--". For clarity, user 202 inputs the same Morse code pass code as a double tap code 214: "●●●●●●●●●●●●●●●●●●●●●●●●●●●●●●". User 202 can also modulate a depth of pressing on touchscreen 204 between hard and soft touches 216, 218 instead of using single and double taps. In one or more embodiments, user can swipe right 220 to confirm recognized Morse code 222 on touchscreen 204 or sweep left 224 to clear incorrectly recognized Morse code 222.

In one or more embodiments, a binary code for user inputs is based on Morse code, adapted to sensing capabilities of a mobile device or abilities of a user. User input does not require traditional interaction with a user interface. For example, the mobile device can be tapped while in a pocket or a touchscreen can be tapped without seeing anything displayed on the touch screen. For another example, user input can be made by shaking or impacting the case of a mobile device that is sensed by a motion sensor. Depending on the capabilities of the mobile device and the user, a distinction between binary states can be made based on difference in number of user inputs such as single and double taps, either sensed by a touch screen or a motion sensor.

TABLE 1 provides examples of binary codes that are based on Morse code. For example, a single-double tap code replaces the long symbols with a double tap. For another example, soft and hard taps are detected for short and long symbols. For an additional example, single taps are used for both short and long with a duration of time following the tap indicating whether short or long. An end tap or a screen swipe "S" can be added so that the duration of the last symbol is indicated before a new character is input.

TABLE 1

| Character | Morse Code | Single-Double Tap | Hard-Soft | Pause Code |
|---|---|---|---|---|
| A | • — | • •• | •■ | •• S |
| B | — • • • | •• • • • | ■••• | • ••S |
| C | — • — • | •• • •• • | ■•■• | • •• S |
| D | — • • | •• • • | ■•• | • ••S |
| E | • | • | • | •S |
| F | • • — • | • • •• • | ••■• | ••• •S |
| G | — — • | •• •• • | ■■• | • • •S |
| H | • • • • | • • • • | •••• | ••••S |
| I | • • | • • | •• | •• S |
| J | • — — — | • •• •• •• | •■■■ | •• • • S |
| K | — • — | •• • •• | ■•■ | • •• S |
| L | • — • • | • •• • • | •■•• | •• ••S |
| M | — — | •• •• | ■■ | • • S |
| N | — • | •• • | ■• | • •S |
| O | — — — | •• •• •• | ■■■ | • • • S |
| P | • — — • | • •• •• • | •■■• | •• • •S |
| Q | — — • — | •• •• • •• | ■■•■ | • • •• S |
| R | • — • | • •• • | •■• | •• •S |
| S | • • • | • • • | ••• | •••S |
| T | — | •• | ■ | • S |
| U | • • — | • • •• | ••■ | ••• S |
| V | • • • — | • • • •• | •••■ | •••• S |
| W | • — — | • •• •• | •■■ | •• • S |
| X | — • • — | •• • • •• | ■••■ | • •••• S |
| Y | — • — — | •• • •• •• | ■•■■ | • ••• S |
| Z | — — • • | •• •• • • | ■■•• | • • ••S |
| N | — • | •• • | ■• | • •S |
| O | — — — | •• •• •• | ■■■ | • • • S |
| P | • — — • | • •• •• • | •■■• | •• • •S |
| Q | — — • — | •• •• • •• | ■■•■ | • • •• S |
| R | • — • | • •• • | •■• | •• •S |
| S | • • • | • • • | ••• | •••S |
| T | — | •• | ■ | • S |
| U | • • — | • • •• | ••■ | ••• S |
| V | • • • — | • • • •• | •••■ | •••• S |
| W | • — — | • •• •• | •■■ | •• • S |
| X | — • • — | •• • • •• | ■••■ | • •••• S |
| Y | — • — — | •• • •• •• | ■•■■ | • ••• S |
| Z | — — • • | •• •• • • | ■■•• | • • ••S |
| 1 | • — — — — | • •• •• •• •• | •■■■■ | •• • • • S |
| 2 | • • — — — | • • •• •• •• | ••■■■ | ••• • • S |
| 3 | • • • — — | • • • •• •• | •••■■ | •••• • S |
| 4 | • • • • — | • • • • •• | ••••■ | ••••• S |
| 5 | • • • • • | • • • • • | ••••• | •••••S |

TABLE 1-continued

| Character | Morse Code | Single-Double Tap | Hard-Soft | Pause Code |
|---|---|---|---|---|
| 6 | — · · · · | ·· · · · · | ■ · · · · | · · · · · S |
| 7 | — — · · · | ·· ·· · · · | ■ ■ · · · | · · · · · S |
| 8 | — — — · · | ·· ·· ·· · · | ■ ■ ■ · · | · · · · · S |
| 9 | — — — — · | ·· ·· ·· ·· · | ■ ■ ■ ■ · | · · · · · · S |
| 0 | — — — — — | ·· ·· ·· ·· ·· | ■ ■ ■ ■ ■ | · · · · · · S |
| . | · — · — · — | ·· · ·· · ·· · | · ■ · ■ · ■ | ·· ·· ·· · S |
| , | — — · · — — | ·· ·· · · ·· ·· | ■ ■ · · ■ ■ | · ·· ·· ·· S |
| : | — — — · · | ·· ·· ·· · · | ■ ■ ■ · · | · · · · · S |
| ? | · · — — · · | · ·· ·· · · | ·· ■ ■ · · | ··· · · · S |

Figure 3:
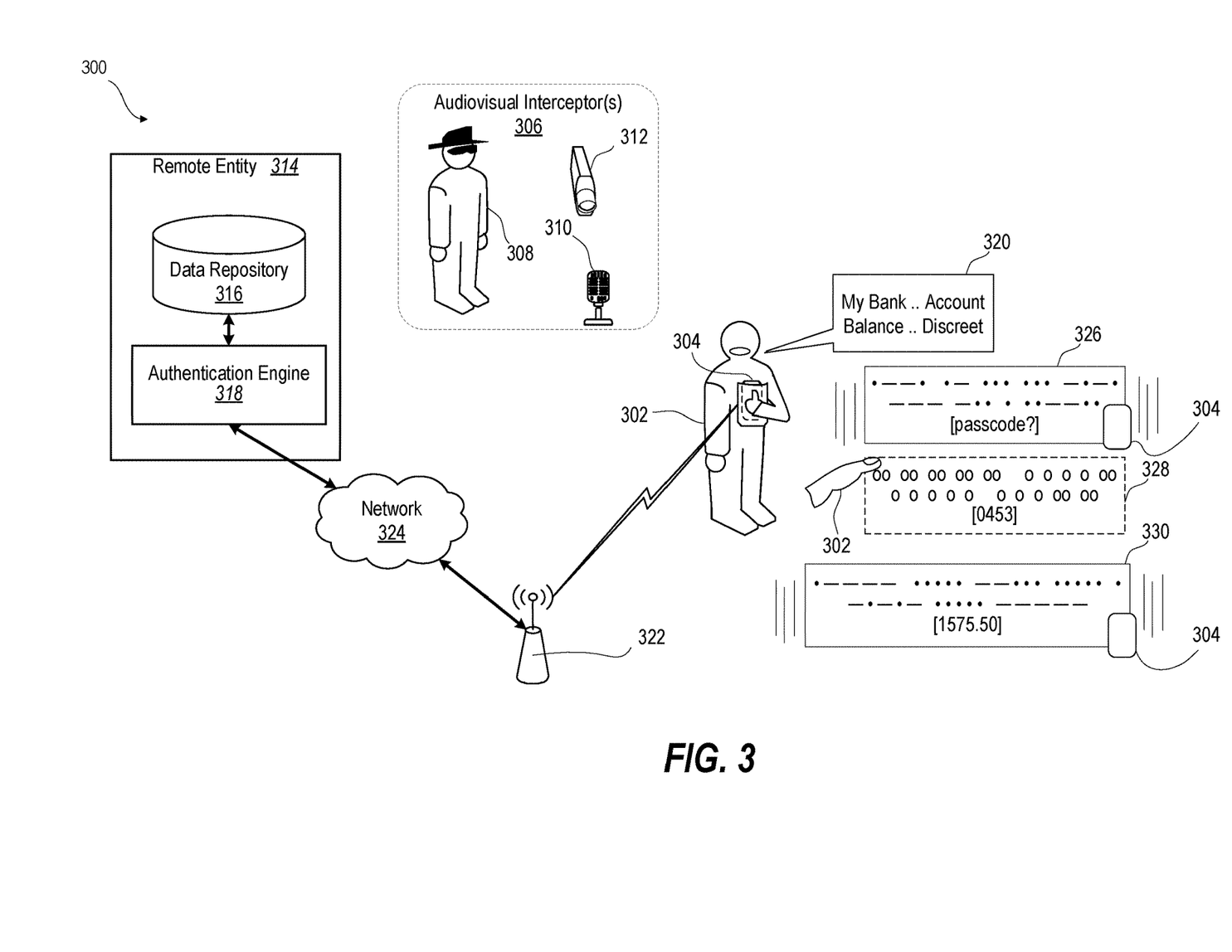
FIG. 3 illustrates a block diagram of a computing device that performs tactile authentication of a user via a mobile device, according to one or more embodiments.

FIG. 3 illustrates a block diagram of a communication system 300 that performs tactile authentication with a user 302 via a mobile device 304. User 302 is within interception proximity with audio visual interceptors 306, such as third party person 308, microphone 310 and camera 312. User 302 is communicating with a remote entity 314 that has data repository 316 accessed by authentication engine 318 to query or answer user 302. In an illustrative scenario, user 302 invokes a voice-activated application on mobile device 304 by verbalizing a command 320: "My bank . . . account balance . . . discreet." The command 320 is relayed via an access node 322 over network 324 to remote entity 314. Remote entity 314 causes mobile device 304 to respond with a vibration output 326: "●--●●- ●●●●●●- ●- ●---- ●●●●--●●", which translated to "Passcode?". User 302 taps on his pocketed mobile device 304 to respond with double tap code 328: "oo oo oo oo o o o o oo o o o o o o o o oo oo", which translates to "0453". Remote entity 314 causes mobile device 304 to discreetly provide user's sensitive information 330: "●----●●●●●-- ●●●●●●●●- ●-●-●●●●●-----" that translates to "1575.50".

Figure 4:
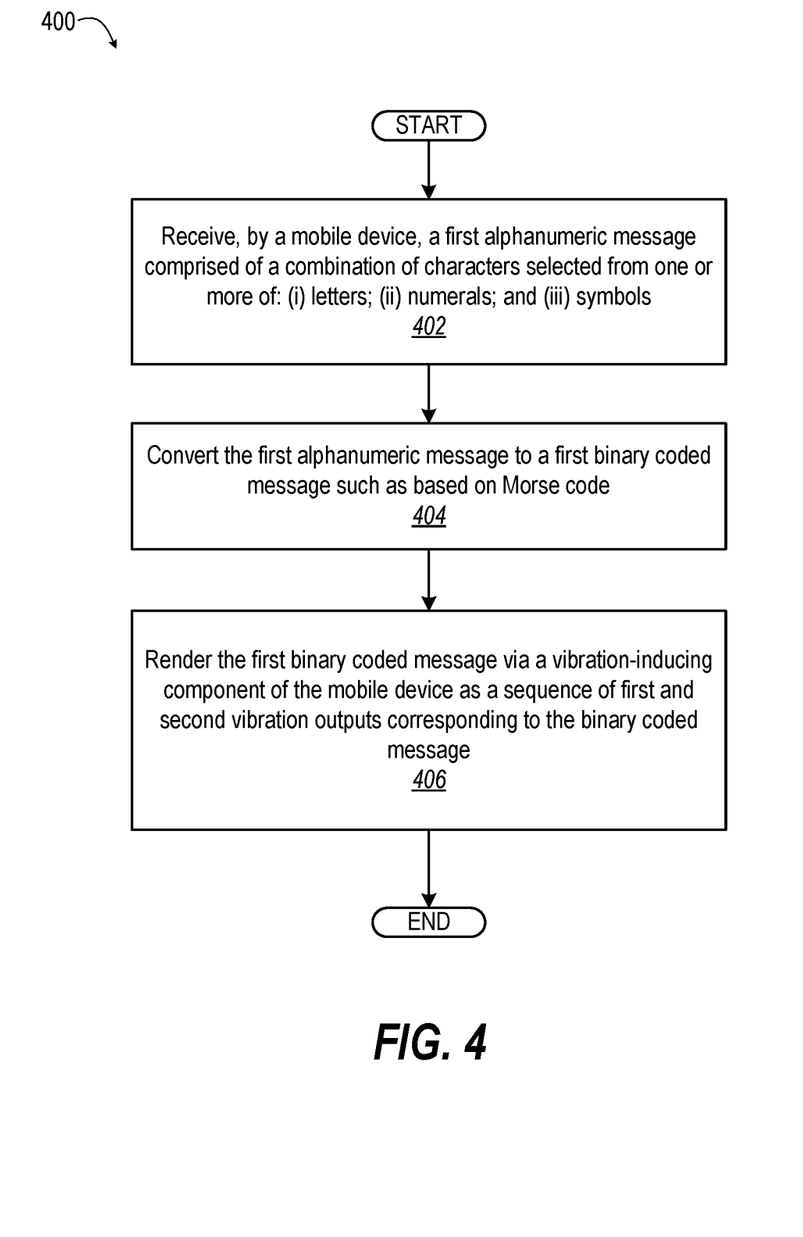
FIG. 4 illustrates a flow diagram of a method of communicating a binary coded message to a user by vibrating a mobile device, according to one or more embodiments.

FIG. 4 illustrates a flow diagram of a method 400 of communicating binary coded messages to a user by vibrating a mobile device. Method 400 enables surreptitious communication with a user via a mobile device. Binary vibrational output of the mobile device is difficult for third parties to notice or intercept. Method 400 begins receiving, by a mobile device, a first alphanumeric message comprised of a combination of characters selected from one or more of: (i) letters; (ii) numerals; and (iii) symbols (block 402). Method 400 includes converting the first alphanumeric message to a first binary coded message such as based on Morse code (block 404). Method 400 includes rendering the first binary coded message via a vibration-inducing component of the mobile device as a sequence of first and second vibration outputs corresponding to the binary coded message (block 406). The first vibration output is humanly distinguishable from the second vibration output. In one or more embodiments, the first vibration output the first and second vibration outputs are of a different duration. In one or more embodiments, a vibration motor is capable of vibrating at a different speed or intensity. Then method 400 ends.

Figure 5:
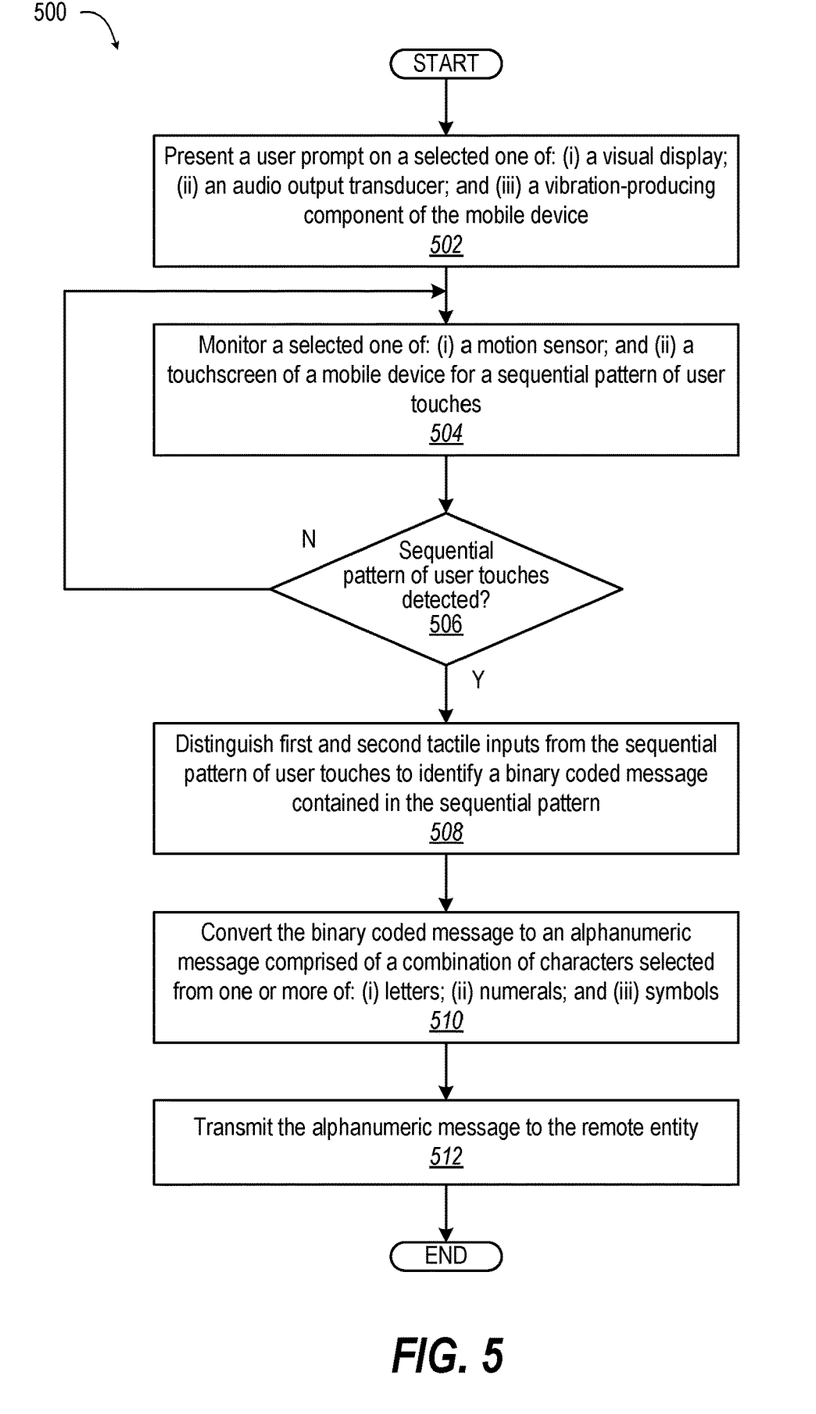
FIG. 5 illustrates a flow diagram of a method of receiving a binary coded message as a pattern of user touches of a mobile device, according to one or more embodiments.

FIG. 5 illustrates a flow diagram of a method of 500 receiving a binary coded message as a pattern of user touches of a mobile device. In an illustrative embodiment, a remote entity interacts with the user of the mobile device as part of multi-factor authentication. Method 500 begins presenting a user prompt on a selected one or more of: (i) a visual display; (ii) an audio output transducer; and (iii) a vibration-producing component of the mobile device (block 502). Method 500 includes monitoring a selected one of: (i) a motion sensor; and (ii) a touchscreen of a mobile device for a sequential pattern of user touches (block 504). A determination is made as to whether a sequential pattern of user touches is detected by the selected one of the motion sensor and the touchscreen (decision block 506). In response to determining that a sequential pattern of user touches is not detected, method 500 returns to block 504 to continue monitoring. In response to determining that a sequential pattern of user touches is detected, method 500 includes distinguishing first and second tactile inputs from the sequential pattern of user touches to identify a binary coded message contained in the sequential pattern (block 508). Method 500 includes converting the binary coded message to an alphanumeric message comprised of a combination of characters selected from one or more of: (i) letters; (ii) numerals; and (iii) symbols (block 510). The alphanumeric message is transmitted to the remote entity (block 512). Then method 500 ends.

In one or more embodiments, the binary coded message can be based on Morse code. In addition, distinguishing the first and second tactile inputs from the sequential pattern of user touches can be based on a selected one of: (i) a number of taps; (ii) an interval of time between user touches; and (iii) a magnitude of impact of each user touch to identify a second binary coded message contained in the sequential pattern.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

Figure 6:
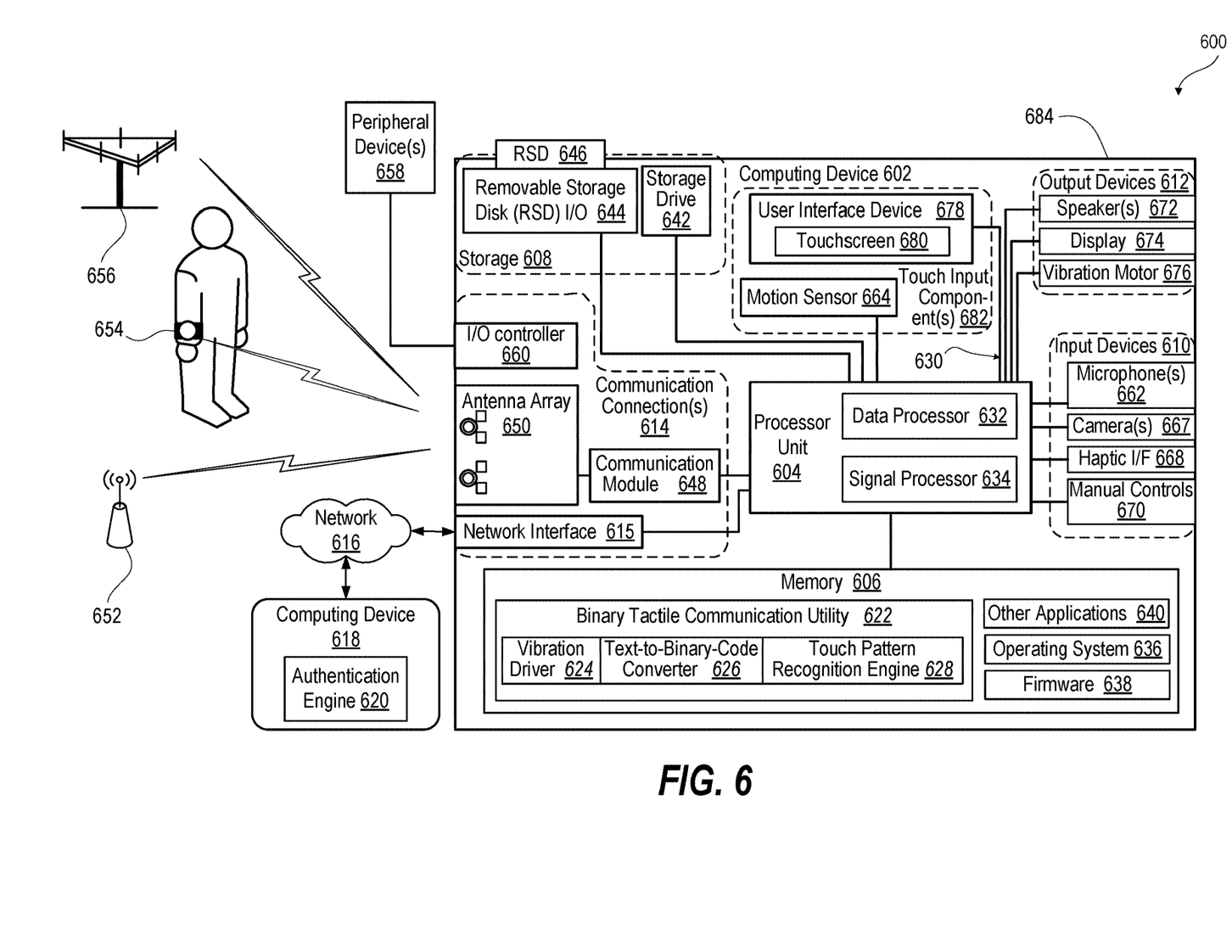
FIG. 6 illustrates a block diagram of a system having a computing device that performs two-way binary coded communication with a user respectively by vibrations and discrete touches, according to one or more embodiments.

FIG. 6 illustrates a system 600 including a computing device 602 configured to implement one or more embodiments provided herein. In one configuration, computing device 602 includes at least one processing unit 604 and memory 606. Depending on the exact configuration and type of computing device, memory 606 may be volatile, such as random access memory (RAM), non-volatile, such as random operating memory (ROM), flash memory, etc., or a combination of the two. In other embodiments, computing device 602 includes additional features or functionality. For example, device 602 may include additional storage such as removable storage or non-removable storage, including, but not limited to, magnetic storage, optical storage, etc. Such additional storage is illustrated in FIG. 6 by storage 608. In one or more embodiments, computer readable instructions to implement one or more embodiments provided herein are in storage 608. Storage 608 may store other computer readable instructions to implement an operating system, an application program, etc. Computer readable instructions may be loaded in memory 606 for execution by processing unit 604, for example.

The term "computer readable media" as used herein includes computer storage media. Computer storage media includes volatile and nonvolatile, removable and non-removable media implemented in any method or technology for storage of information such as computer readable instructions or other data. Memory 606 and storage 608 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by computing device 602. Any such computer storage media is part of computing device 602.

Computing device 602 includes input device(s) 610 such as keyboard, mouse, pen, voice input device, touch input device, infrared cameras, video input devices, or any other input device. Output device(s) 612 such as one or more displays, speakers, printers, or any other output device may be included with computing device 602. Input device(s) 610 and output device(s) 612 may be connected to computing device 602 via a wired connection, wireless connection, or any combination thereof. In one or more embodiments, an input device 610 or an output device 612 from another computing device may be used as input device(s) 610 or output device(s) 612 for computing device 602. Computing device 602 may include communication connection(s) 614 that includes network interface 615 to facilitate communications via a network 616 with one or more other computing devices 618 that communicate for authentication engine 620. Certain functionalities can be performed by software applications resident in memory 606, such as binary tactile communication utility 622 that includes text-to-binary converter 624, vibration driver 626, and touch pattern recognition engine 628.

Referring now to an example specific component makeup and the associated functionality of the presented components, computing device 602 can incorporate a wide range of functionality increasingly typical of mobile devices. Processor unit 604 can be an integrated circuit (IC) that connects, via a plurality of bus interconnects 630, to a plurality of functional components of computing device 602. Processor unit 604 can include one or more programmable microprocessors, such as data processor 632 and digital signal processor (DSP) 634 of processor unit 604, which may both be integrated into a single processing device, in some embodiments. Processor unit 604 controls the communication, user interface, and other functions and/or operations of computing device 602. These functions and/or operations thus include, but are not limited to including, application data processing and signal processing. Computing device 602 may use hardware component equivalents such as special purpose hardware, dedicated processors, general purpose computers, microprocessor-based computers, micro-controllers, optical computers, analog computers, dedicated processors and/or dedicated hard wired logic. Connected to processor unit 604 is memory 606, which can include volatile memory and/or non-volatile memory. Memory 606 stores software, such as operating system 636, as well as firmware 638. One or more other executable applications 640 can be stored within memory 606 for execution by processor unit 604. Memory 606 may be augmented by on-device data storage, such as storage drive 642. Also connected to processor unit 604 is removable storage device (RSD) input/output (I/O) interface 644 that receives an RSD 646 for additional storage.

According to the illustrative embodiment, computing device 602 supports wireless communication via a communication module 648. Communication module 648 directs and power modulates a transmission beam at selected frequencies over an antenna array 650. For example, computing device 602 may support communication protocols and transceiver radio frequencies appropriate for a wireless local area network (WLAN), illustrated as node 652. Computing device 602 can communicate over a personal access network (PAN) with devices such as a smart watch 654. Computing device 602 can communicate with a radio access network (RAN) 656 that is part of a wireless wide area network (WWAN). In certain embodiments, computing device 602 may also support a hardwired local access network (LAN) (not shown) or peripheral devices 658 via an I/O controller 660.

Input devices 610 includes microphone(s) 662 that receive user audible inputs. Motion sensor 664 can detect contextual motion of computing device 602 as well as intentional user inputs according to aspects of the present disclosure. Image capturing device, such as a camera 667, can receive gestures and other image data. Haptic control 668 can provide an interface such as for braille reading or manual inputs. Other manual or keys 670 can have dedicated or programmed capabilities.

Output devices 612 includes audio speaker(s) 672 that can augment or provide alternate presentation of the visual or tactile outputs or provide playback. Display 674 presents graphical or alphanumeric information in a visual form. Vibration motor 676 provides alerts and more detailed information according to aspects of the present disclosure. Computing device 602 can utilize touchscreen 680 and/or motion sensor 664 as a touch input component 682 for aspects of the present disclosure.

User interface device 678 such as, or including, a touch screen 680, represents a component acting as both an input device 610 and an output device 612. Computing device 602 can be wholly or substantially encompassed by an enclosure 684. In one or more embodiments, computing device 602 can be a distributed system of wireless or wired links or a component subsystem incorporated into a larger assembly or system.

Figure 7:
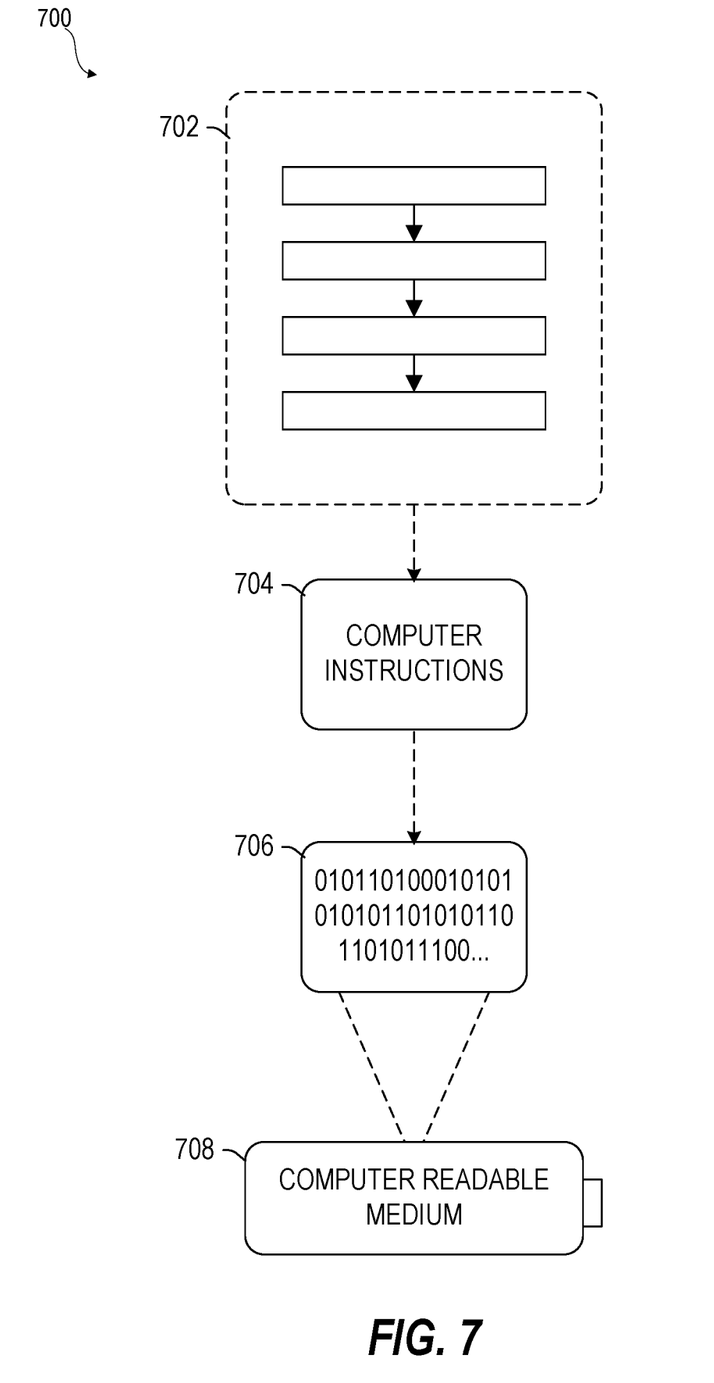
FIG. 7 illustrates a block diagram of example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 7, wherein an implementation 700 includes a computer-readable medium 708, such as a CD-R, DVD-R, flash drive, a platter of a hard disk drive, etc., on which is encoded computer-readable data 706. This computer-readable data 706, such as binary data including a plurality of zero's and one's as shown in 706, in turn includes a set of computer instructions 704 configured to operate according to one or more of the principles set forth herein. In one such embodiment 700, the processor-executable computer instructions 704 may be configured to perform a method, such as method 400 of FIG. 4, or method 500 of FIG. 5. In another embodiment, the processor-executable instructions 704 may be configured to implement a system, such as the system 100 or mobile device 106 of FIG. 1 or computing device 602 of FIG. 6. Many such computer-readable media may be devised by those of ordinary skill in the art that are configured to operate in accordance with the techniques presented herein.

One or more embodiments may employ various artificial intelligence (AI) based schemes for carrying out various aspects thereof. One or more aspects may be facilitated via an automatic classifier system or process. A classifier is a function that maps an input attribute vector, x=(x1, x2, x3, x4, xn), to a confidence that the input belongs to a class. In other words, f(x)=confidence (class). Such classification may employ a probabilistic or statistical-based analysis (e.g., factoring into the analysis utilities and costs) to prognose or infer an action that a user desires to be automatically performed.

A support vector machine (SVM) is an example of a classifier that may be employed. The SVM operates by finding a hypersurface in the space of possible inputs, which the hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein, may be inclusive of statistical regression utilized to develop models of priority.

One or more embodiments may employ classifiers that are explicitly trained (e.g., via a generic training data) as well as classifiers which are implicitly trained (e.g., via observing user behavior, receiving extrinsic information). For example, SVMs may be configured via a learning or training phase within a classifier constructor and feature selection module. Thus, a classifier may be used to automatically learn and perform a number of functions, including but not limited to determining according to a predetermined criteria.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising."

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising," "comprises," "including," "includes," or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system, comprising:
a processor coupled to a memory that includes instructions that, when executed by the processor, cause the processor to:
convert a received alphanumeric message into a first encoded message, wherein the received alphanumeric message is a request for a passcode associated with authentication;
trigger vibration of a computing device corresponding to the first encoded message, wherein elements of the first encoded message are humanly distinguishable vibrations;
receive a sequential pattern of user touches on the computing device including one or more user touches on a case of the computing device; and
distinguish tactile inputs from the one or more user touches on the case based on at least one of a number of user touches, an interval of time between user touches, or a magnitude of impact of each user touch to identify a second encoded message in the sequential pattern of user touches.

2. The system of claim 1, wherein the instructions further cause the processor to:
convert the second encoded message into a second alphanumeric message; and
initiate transmission of the second alphanumeric message to a second computing device.

3. The system of claim 2, wherein the instructions further cause the processor to encrypt the second alphanumeric message.

4. The system of claim 1, wherein the instructions further cause the processor to monitor a touch screen of the computing device for the sequential pattern of user touches.

5. The system of claim 1, wherein the instructions further cause the processor to a motion sensor of the computing device for the sequential pattern of user touches on the case of the computing device.

6. The system of claim 1, wherein the second encoded message is a binary coded message.

7. The system of claim 6, wherein the binary coded message is based on Morse code.

8. The system of claim 1, wherein the received alphanumeric message captures one or more of a letter, a number, or a symbol.

9. A computer-readable medium comprising instructions that, when executed, cause a processor to perform operations comprising:
  converting a received alphanumeric message into a first encoded message, wherein the received alphanumeric message is a request for a passcode associated with authentication;
  trigger vibration of a computing device corresponding to the first encoded message, wherein elements of the first encoded message are humanly distinguishable vibrations;
  receiving a sequential pattern of user touches on the computing device including one or more user touches on a case of the computing device; and
  distinguishing tactile inputs from the one or more user touches on the case based on at least one of a number of user touches, an interval of time between user touches, or a magnitude of impact of each user touch to identify a second encoded message in the sequential pattern of user touches.

10. The computer-readable medium of claim 9, the operations further comprising:
  converting the second encoded message into a second alphanumeric message; and
  initiating transmission of the second alphanumeric message to a second computing device over a network.

11. The computer-readable medium of claim 9, the operations further comprising:
  monitoring a touch screen of the computing device for the sequential pattern of user touches.

12. The computer-readable medium of claim 9, the operations further comprising:
  distinguishing Morse code elements of the user touches.

13. The computer-readable medium of claim 9, the operations further comprising:
  receiving a second message and triggering vibration of the computing device in a manner that corresponds with the second message.

14. The computer-readable medium of claim 9, the operations further comprising:
  receiving a second alphanumeric message;
  converting the second alphanumeric message to a third encoded message; and
  triggering the vibration of the computing device in a manner that corresponds with the third encoded message.

15. A method, comprising:
  converting a received alphanumeric message to a first encoded message, wherein the received alphanumeric message is a request for a passcode associated with authentication;
  triggering vibration of a computing device corresponding to the first encoded message, wherein elements of the first encoded message are humanly distinguishable vibrations;
  receiving a sequential pattern of user touches on the computing device including one or more user touches on a case of the computing device; and
  distinguishing tactile inputs from the one or more user touches on the case based on at least one of a number of touches, an interval of time between user touches, or a magnitude of impact of each user touch to identify a second encoded message in the sequential pattern of user touches.

16. The method of claim 15, the operations further comprising:
  generating a second alphanumeric message based on the second encoded message.

17. The method of claim 16, further comprising initiating transmission of the second alphanumeric message in response to the request for the passcode.

* * * * *